United States Patent
Jindal et al.

(10) Patent No.: US 9,400,811 B2
(45) Date of Patent: Jul. 26, 2016

(54) SYSTEMS AND METHODS FOR INCREASING THE SCALABILITY OF SOFTWARE-DEFINED NETWORKS

(71) Applicant: Juniper Networks, Inc., Sunnyvale, CA (US)

(72) Inventors: Apoorva Jindal, San Jose, CA (US); Jainendra Kumar, Fremont, CA (US); Rahul S. Kasralikar, San Jose, CA (US); Sandeep Bajaj, San Ramon, CA (US); Ramya Olichandran, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 403 days.

(21) Appl. No.: 13/936,033

(22) Filed: Jul. 5, 2013

(65) Prior Publication Data
US 2015/0012484 A1    Jan. 8, 2015

(51) Int. Cl.
*G06F 17/30* (2006.01)
*H04L 12/851* (2013.01)

(52) U.S. Cl.
CPC ...... *G06F 17/30289* (2013.01); *H04L 47/2483* (2013.01)

(58) Field of Classification Search
CPC combination set(s) only.
See application file for complete search history.

(56) References Cited

U.S. PATENT DOCUMENTS

| | | | |
|---|---|---|---|
| 6,426,943 B1 * | 7/2002 | Spinney et al. | 370/235 |
| 2006/0056384 A1 * | 3/2006 | Ishii et al. | 370/351 |
| 2008/0262990 A1 * | 10/2008 | Kapoor et al. | 706/20 |
| 2010/0265949 A1 * | 10/2010 | Cervantes | 370/392 |
| 2011/0116377 A1 | 5/2011 | Batz et al. | |

FOREIGN PATENT DOCUMENTS

| | | |
|---|---|---|
| EP | 2600577 | 6/2013 |
| WO | WO-2012/058320 | 5/2012 |

OTHER PUBLICATIONS

McKeown, Nick et al., "OpenFlow: Enabling Innovation in Campus Networks", http://www.openflow.org/documents/openflow-wp-latest.pdf, (Mar. 14, 2008).

"OpenFlow Switch Specification", http://www.openflow.org/documents/openflow-spec-v1.1.0.pdf, Version 1.1.0 Implemented (Wire Protocol 0x02), (Feb. 28, 2011).

* cited by examiner

*Primary Examiner* — Jay Morrison
(74) *Attorney, Agent, or Firm* — ALG Intellectual Property, LLC

(57) ABSTRACT

A computer-implemented method for increasing the scalability of software-defined networks may include (1) maintaining a set of databases collectively configured to (i) store a set of flow entries that direct network traffic within a software-defined network and (ii) facilitate searching the set of flow entries based at least in part on at least one key whose size remains substantially constant irrespective of the number of flow entries within the set of flow entries, (2) detecting a request to perform an operation in connection with a flow of data packets within the software-defined network, (3) identifying at least one attribute of the flow of data packets in the request, and then (4) searching, using the attribute of the flow of data packets as a database key, at least one database within the set of databases to facilitate performing the operation. Various other methods, systems, and apparatuses are also disclosed.

20 Claims, 11 Drawing Sheets

Flow Entry
706

PRIORITY LEVEL:    3

MATCH CONDITIONS:

INGRESS PORT:    4
    VLAN ID:         6
    •                •
    •                •
    •                •

ACTION:    Forward Data Packets to Computing Device 204(N)

STATISTICS:

RECEIVED PACKETS:    20000
    RECEIVED BYTES:      1500000
    DURATION:            47000000
    •                    •
    •                    •
    •                    •

*FIG. 8*

SYSTEMS AND METHODS FOR INCREASING THE SCALABILITY OF SOFTWARE-DEFINED NETWORKS

BACKGROUND

Software-defined networks often include switches that direct network traffic from one computing device to another based on a set of flow entries. For example, an OPENFLOW-enabled switch may, upon receiving a data packet from a device (such as a server or another switch) within a software-defined network, search an onboard database for a flow entry that specifies how to handle the data packet. OPENFLOW-enabled switches may also update these flow entries as changes occur within the software-defined network. For example, an OPENFLOW-enabled switch may add a new flow entry to a database, modify an existing flow entry within a database, and/or delete an existing flow entry from a database in response to a request for the same from a remote controller responsible for managing the flow of data packets among devices within the software-defined network.

In traditional approaches, OPENFLOW-enabled switches may maintain these flow entries as linked list data structures. As a result, an OPENFLOW-enabled switch may need to sift through a linked list entry-by-entry in order to perform certain operations (such as looking up, adding, modifying, and/or deleting flow entries). Unfortunately, due to this entry-by-entry sifting, the OPENFLOW-enabled switch may suffer significant performance degradation as the number of flow entries within the linked list increases beyond a certain point.

As such, the instant disclosure identifies and addresses a need for improved systems and methods for increasing the scalability of software-defined networks.

SUMMARY

As will be described in greater detail below, the instant disclosure generally relates to systems and methods for increasing the scalability of software-defined networks. In one example, a computer-implemented method for accomplishing such a task may include (1) maintaining a set of databases that are collectively configured to (i) store a set of flow entries that collectively direct network traffic within a software-defined network and (ii) facilitate searching the set of flow entries based at least in part on at least one key whose size remains substantially constant irrespective of the number of flow entries within the set of flow entries, (2) detecting a request to perform an operation in connection with at least one flow of data packets within the software-defined network, (3) identifying at least one attribute of the flow of data packets in the request, and then (4) searching, using the attribute of the flow of data packets as a database key, at least one database within the set of databases to facilitate performing the operation in connection with the flow of data packets. In this example, the amount of time required to search the database may be independent of the number of flow entries within the set of flow entries due at least in part to the substantially constant size of the database's key.

Similarly, a system for implementing the above-described method may include (1) a maintenance module that maintains a set of databases that are collectively configured to (i) store a set of flow entries that collectively direct network traffic within a software-defined network and (ii) facilitate searching the set of flow entries based at least in part on at least one key whose size remains substantially constant irrespective of the number of flow entries within the set of flow entries, (2) a detection module that detects a request to perform an operation in connection with at least one flow of data packets within the software-defined network, (3) an identification module that identifies at least one attribute of the flow of data packets in the request, (4) a search module that searches, using the attribute of the flow of data packets as a database key, at least one database within the set of databases to facilitate performing the operation in connection with the flow of data packets, and (5) at least one physical processor configured to execute the maintenance module, the detection module, the identification module, and the search module. In this system, the amount of time required to search the database may be independent of the number of flow entries within the set of flow entries due at least in part to the substantially constant size of the database's key.

In addition, an apparatus for implementing the above-described method may include (1) memory configured to store a set of databases that (i) include a set of flow entries that collectively direct network traffic within a software-defined network and (ii) facilitate searching the set of flow entries based at least in part on at least one key whose size remains substantially constant irrespective of the number of flow entries within the set of flow entries and (2) at least one processor configured to (i) maintain the set of databases stored in the memory, (ii) detect a request to perform an operation in connection with at least one flow of data packets within the software-defined network, (iii) identify at least one attribute of the flow of data packets in the request, and then (iv) search, using the attribute of the flow of data packets as a database key, at least one database within the set of databases to facilitate performing the operation in connection with the flow of data packets. In this example, the amount of time required to search the database may be independent of the number of flow entries within the set of flow entries due at least in part to the substantially constant size of the database's key.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 is an illustration of an exemplary flow entry within the core database illustrated in FIG. 6.

Figure 1:
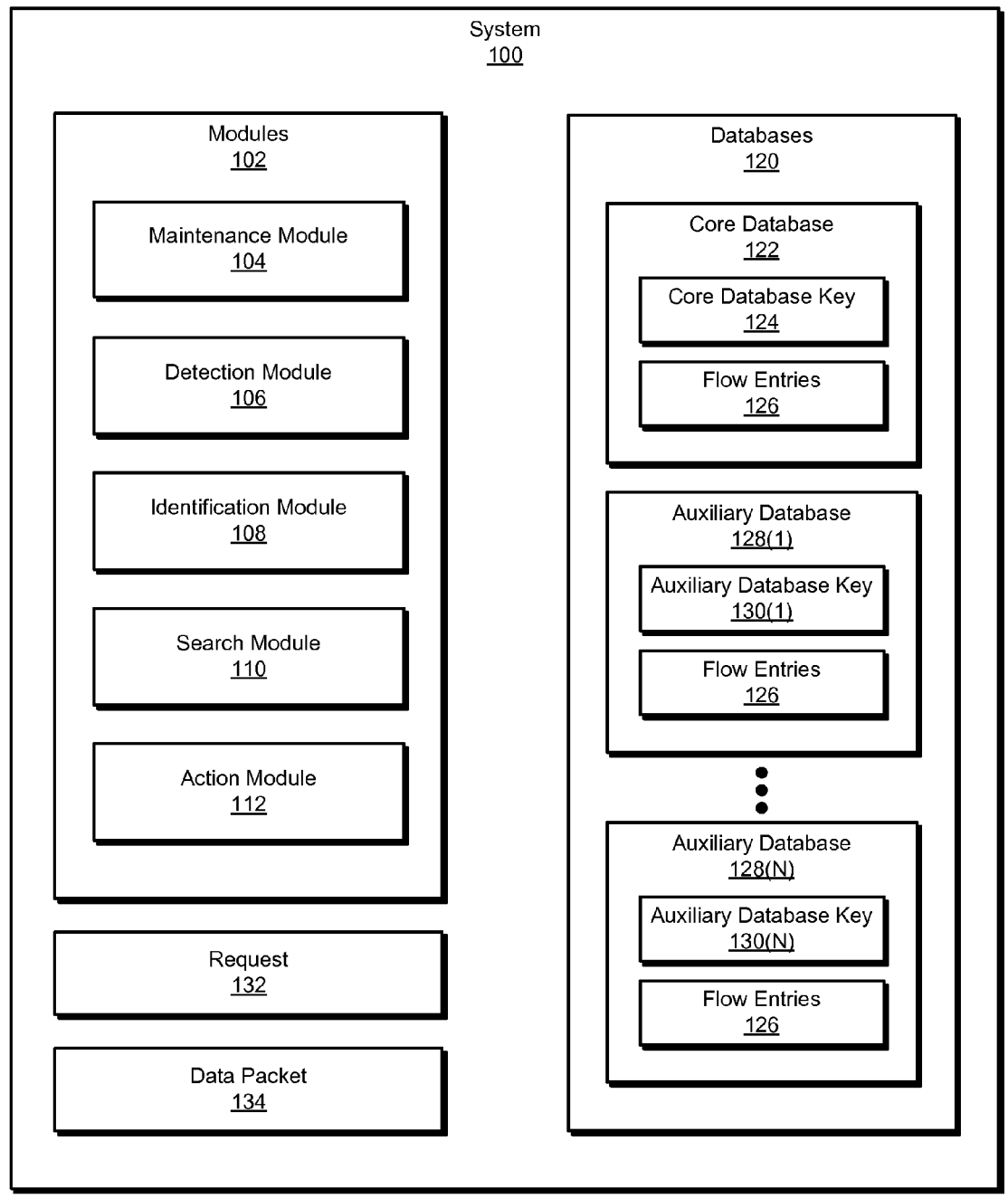
FIG. 1 is a block diagram of an exemplary system for increasing the scalability of software-defined networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for increasing the scalability of software-defined networks. As will be explained in greater detail below, a switch may direct network traffic within a software-defined network based on a set of flow entries maintained in a set of databases. By configuring at least one of these databases to have a key whose size remains substantially constant as the number of flow entries within the database increases, the embodiments disclosed herein may enable the switch to perform an operation (such as looking up, adding, modifying, or deleting flow entries) on this database in the same amount of time irrespective of the number of flow entries within the database. This may in turn enable the switch to maintain a consistent level of performance, even as the number of flow entries within the database increases, thereby increasing the scalability of the software-defined network that includes the switch.

The following will provide, with reference to FIGS. 1, 2, and 4-10, examples of systems capable of increasing the scalability of software-defined networks. A detailed description of an exemplary method for increasing the scalability of software-defined networks will also be provided in connection with FIG. 3. Finally, the discussion corresponding to FIG. 11 will provide examples of systems that may include the systems and elements illustrated in FIGS. 1, 2, and 4-10.

The phrase "software-defined network," as used in connection with the accompanying drawings and claims, generally refers to any type or form of network that includes one or more switching devices capable of being configured and/or programmed by a remote and/or centralized controller. In one example, a software-defined network may provide a scalable infrastructure with Application Programming Interface (API) support that facilitates virtualized services that automate and/or control traffic within a network setting. In this example, the software-defined network may provide elastic management of Internet Protocol (IP)-based virtual network and/or security services that enhance the efficiency and/or agility of network deployment and utilization.

In addition, the phrase "flow entry," as used herein, generally refers to any type or form of database entry that corresponds to at least one flow of data packets within a software-defined network. In one example, a flow entry may correspond to a data packet if the flow entry and data packet have certain attributes and/or match conditions in common. For example, a switch may, upon encountering a data packet transferred within a software-defined network, iterate through a set of flow entries until identifying a flow entry whose match conditions match attributes of the data packet.

Flow entries may include a variety of data and/or information. In one example, a flow entry may include information that indicates how to handle a data packet and/or statistics associated with the flow entry. For example, a flow entry may include control logic that directs a switch to perform at least one action on a data packet. In this example, the flow entry may also include statistics that identify how many data packets received by the switch have matched the flow entry.

The phrase "match condition," as used herein, generally refers to any type or form of characteristic, attribute, condition, and/or header information that corresponds to and/or describes a flow of data packets within a software-defined network. Examples of such match conditions include, without limitation, ingress (or incoming) ports, egress (or outgoing) ports, Ethernet source addresses, Ethernet destination addresses, Ethernet types, Virtual Local Area Network (VLAN) identifiers, VLAN priority levels, IP source addresses, IP destination addresses, IP protocols, IP Type of Service (ToS) bits, transport source ports, Internet Control Message Protocol (ICMP) types, transport destination ports, ICMP codes, combinations of one or more of the same, or any other suitable match conditions.

Finally, the term "database key" (or simply "key"), as used herein, generally refers to any type or form of attribute and/or sequence of characters that identifies and/or defines a search path within a database. In one example, a key may uniquely identify and/or define a search path that leads to at least one flow entry within a database. For example, a switch may search a database for at least one flow entry that corresponds to a key by traversing the database along a search path uniquely identified and/or defined by the key. In this example, upon traversing the database along the search path, the switch may reach and/or identify the flow entry within the database.

FIG. 1 is a block diagram of an exemplary system 100 for increasing the scalability of software-defined networks. As illustrated in this figure, exemplary system 100 may include one or more modules 102 for performing one or more tasks. For example, and as will be explained in greater detail below, exemplary system 100 may include a maintenance module 104 that maintains a set of databases that are collectively configured to (1) store a set of flow entries that collectively direct network traffic within a software-defined network and (2) facilitate searching the set of flow entries based at least in part on at least one key whose size remains substantially constant irrespective of the number of flow entries within the set of flow entries. Exemplary system 100 may also include a detection module 106 that detects a request to perform an operation in connection with at least one flow of data packets within the software-defined network.

In addition, and as will be described in greater detail below, exemplary system 100 may include an identification module 108 that identifies at least one attribute of the flow of data packets in the request. Exemplary system 100 may further include a search module 110 that searches, using the attribute of the flow of data packets as a database key, at least one database within the set of databases to facilitate performing the operation in connection with the flow of data packets. Moreover, exemplary system 100 may include an action module 112 that performs at least one action on data packets within the software-defined network.

In certain embodiments, modules 102 in FIG. 1 may represent one or more software applications or programs that, when executed by a computing device, may cause the computing device to perform one or more tasks. For example, and as will be described in greater detail below, modules 102 may represent software modules stored and configured to run on one or more computing devices, such as the devices illustrated in FIG. 2 (e.g., switching devices 202(1)-(N), computing devices 204(1)-(N), computing devices 208(1)-(N), and/or controller 206) and/or portions of exemplary computing system 1100 in FIG. 11.

Modules 102 in FIG. 1 may also represent all or portions of one or more special-purpose computers configured to perform one or more of the tasks described herein. Although illustrated as separate elements, one or more of modules 102 in FIG. 1 may represent portions of a single module or application (such as JUNIPER NETWORKS' JUNOS network operating system, CISCO SYSTEMS' INTERNETWORK OPERATING SYSTEM (IOS), OPEN VSWITCH, FLOWVISOR, SNAC, PICA8, INDIGO, PANTOU, OPENFAUCET, OPENFLOWJ, NETTLE, POX, NOX, MUL, JAXON, FLOODLIGHT, RYU, NODEFLOW, ROUTEFLOW, and RESONANCE).

As illustrated in FIG. 1, exemplary system 100 may also include one or more databases, such as a set of databases 120. In one example, databases 120 may include both a core database 122 and a set of auxiliary databases 128(1)-(N). In this example, databases 120 may be configured to store a set of flow entries 126.

In some examples, each flow entry within flow entries 126 may include information that indicates how to handle a specific data packet. For example, each of flow entries 126 may identify at least one action to perform on a specific data packet. Examples of such actions include, without limitation, forwarding a data packet to a specific device and/or along a specific network path, forwarding a data packet from and/or to a specific port, encapsulating a data packet for transfer (to, e.g., a remote controller) via a secure channel, enqueuing (or queuing) a data packet in a queue associated with a specific port, dropping a data packet, combinations of one or more of the same, or any other suitable actions.

Additionally or alternatively, each flow entry within flow entries 126 may include one or more statistics associated with the flow entry. For example, each of flow entries 126 may include flow-specific statistics that are updated over time. Examples of such statistics include, without limitation, the number of data packets that have matched a flow entry, the number of bytes included in data packets that have matched a flow entry, the duration of time that a flow entry has been stored in a database or switch, combinations of one or more of the same, or any other suitable statistics associated with a flow entry.

In some examples, each database within databases 120 may include a copy of flow entries 126. In other examples, databases 120 may include a single copy of flow entries 126 that is shared by each database within databases 120.

In some embodiments, core database 122 within databases 120 may store flow entries 126. In these embodiments, one or more of auxiliary databases 128(1)-(N) within databases 120 may also store flow entries 126.

Additionally or alternatively, one or more of auxiliary databases 128(1)-(N) within databases 120 may store data and/or information used to search core database 122 for at least one specific flow entry within flow entries 126. For example, one or more of auxiliary databases 128(1)-(N) may store a list of flow entries (e.g., list of flow entries 1000 in FIG. 10) and/or information that identifies at least one key that defines a specific search path within core database 122. In this example, the auxiliary database(s) may support and/or facilitate searching core database 122 based at least in part on the list of flow entries and/or the key that defines the specific search path.

As will be described in greater detail below, in some examples each database within databases 120 may be configured as a data structure. For example, core database 120 and one or more of auxiliary database 128(1)-(N) may each be configured as a trie data structure. Examples of such trie data structures include, without limitation, tries, compressed tries, radix trees, patricia tries, digital trees, prefix trees, compact prefix trees, combinations of one or more of the same, or any other suitable trie data structures.

Additionally or alternatively, one or more of auxiliary databases 128(1)-(N) may each be configured as a hash table. Examples of such hash tables include, without limitation, associative arrays, sparse arrays, dictionaries, dynamic sets, maps, hash functions, lookup tables, combinations of one or more of the same, or any other suitable hash tables.

As will be described in greater detail below, in some embodiments one or more of the databases within databases 120 may be searchable using a key whose size remains substantially constant irrespective of the number of flow entries within flow entries 126. For example, core database 122 (which may be configured as a trie data structure) may be searchable using core database key 124. In this example, the size of core database key 124 may (due to core database 122 being configured as a trie data structure) remain substantially constant as the number of flow entries within core database 122 increases. Moreover, since the size of core database key 124 remains substantially constant, the amount of time required to perform a database operation (such as looking up, adding, modifying, or deleting flow entries) on core database 122 may also remain substantially constant as the number of flow entries within core database 122 increases.

Databases 120 may represent portions of a single database or computing device or a plurality of databases or computing devices. For example, databases 120 may represent a portion of one or more of switching devices 202(1)-(N), computing devices 204(1)-(N), computing devices 208(1)-(N), controller 206 in FIG. 2, and/or portions of exemplary computing system 1100 in FIG. 11. Additionally or alternatively, databases 120 may represent one or more physically separate devices capable of being accessed by a computing device, such as one or more of switching devices 202(1)-(N), computing devices 204(1)-(N), computing devices 208(1)-(N), controller 206 in FIG. 2, and/or portions of exemplary computing system 1100 in FIG. 11.

As illustrated in FIG. 1, exemplary system 100 may receive one or more requests, such as request 132. In one example, request 132 may direct a switch to perform an operation on at least one database within databases 120. Examples of request 132 include, without limitation, strict requests, non-strict requests, requests to look up a flow entry in at least one database, requests to add a new flow entry to at least one database, requests to modify an existing flow entry within at least one database, requests to delete an existing flow entry from at least one database, requests to obtain statistics associated with a flow entry within at least one database, requests to provide statistics associated with a flow entry to at least one device, combinations of one or more of the same, or any other suitable request.

As illustrated in FIG. 1, exemplary system 100 may also receive one or more data packets, such as data packet 134. In one example, data packet 134 may represent at least one formatted unit of data transferred to a switch within a software-defined network. For example, data packet 134 may represent at least one unit of data formatted in accordance with the OPENFLOW communications protocol. In this example, data packet 134 may be transferred from a computing device to a switch within the software-defined network.

Figure 2:
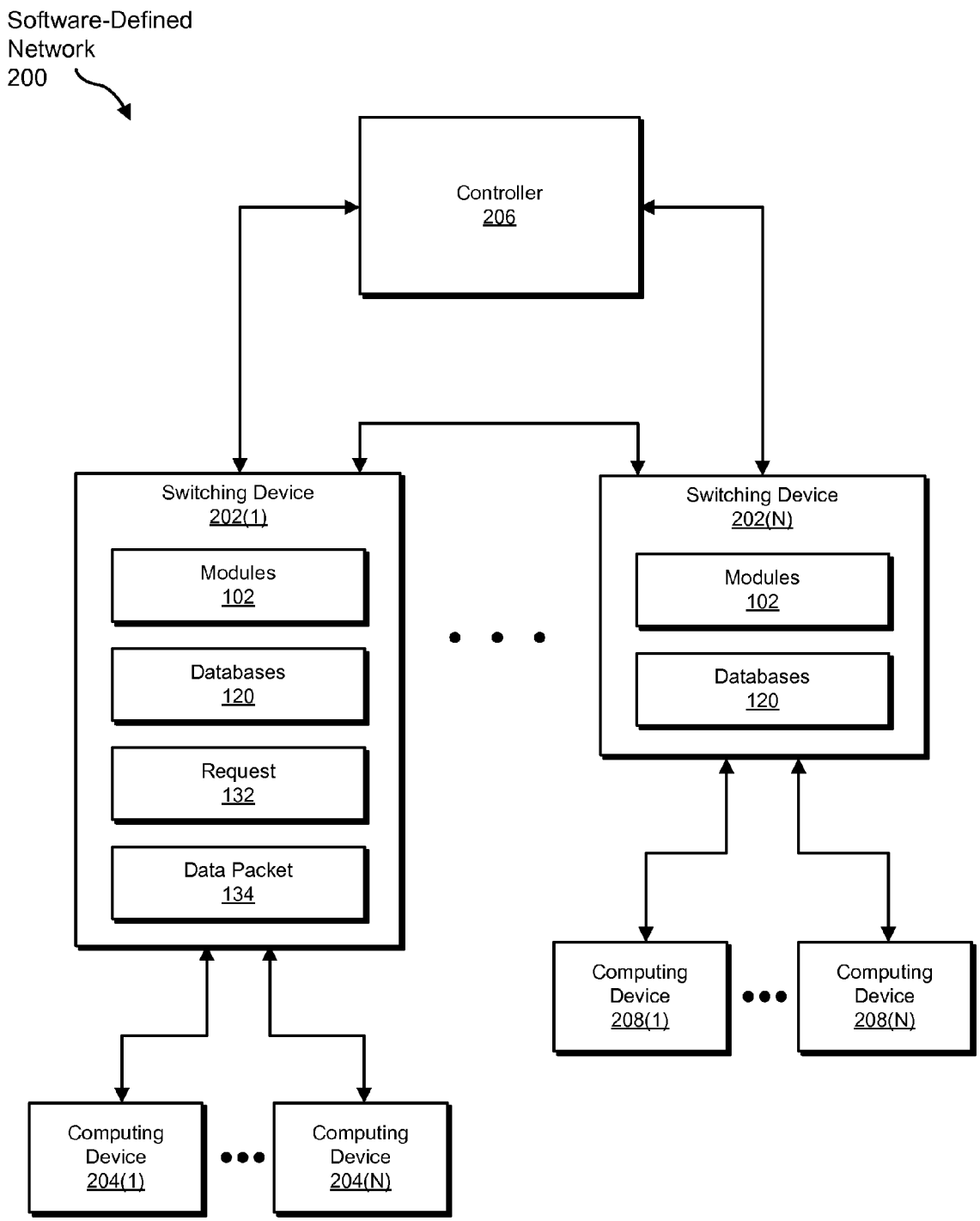
FIG. 2 is a block diagram of an additional exemplary system for increasing the scalability of software-defined networks.

Exemplary system 100 in FIG. 1 may be implemented in a variety of ways. For example, all or a portion of exemplary system 100 may represent portions of exemplary software-defined network 200 in FIG. 2. As shown in FIG. 2, software-defined network 200 may include switching devices 202(1)-(N) in communication with one another and/or in communication with a controller 206. Software-defined network 200 may also include computing devices 204(1)-(N) in communication with switching device 202(1) and computing devices 208(1)-(N) in communication with switching device 202(N).

In one example, switching devices 202(1)-(N) may each be programmed with one or more of modules 102 and/or maintain one or more of databases 120. In this example, switching device 202(1) may have received request 132 and/or data packet 134 from one or more devices (such as controller 206, computing devices 204(1)-(N), and/or computing devices 208(1)-(N)) within software-defined network 200.

In one example, one or more of modules 102 from FIG. 1 may, when executed by at least one processor of at least one of switching devices 202(1)-(N), facilitate increasing the scalability of software-defined networks. For example, and as will be described in greater detail below, one or more of modules 102 may cause a switching device (e.g., one of switching devices 202(1)-(N)) to (1) maintain a set of databases (e.g., databases 120) that are collectively configured to (i) store a set of flow entries (e.g., flow entries 126) that collectively direct network traffic within software-defined network 200 and (ii) facilitate searching the set of flow entries based at least in part on at least one key (e.g., core database key 124 and/or at least one of auxiliary database keys 130(1)-(N)) whose size remains substantially constant irrespective of the number of flow entries within the set of flow entries, (2) detect a request (e.g., request 132) to perform an operation in connection with at least one flow of data packets within software-defined network 200, (3) identify at least one attribute of the flow of data packets in the request, and then (4) search, using the attribute of the flow of data packets as a database key, at least one database (e.g., core database 122 and/or at least one of auxiliary databases 128(1)-(N)) within the set of databases to facilitate performing the operation in connection with the flow of data packets. In this example, the amount of time required to search the database may be independent of the number of flow entries within the set of flow entries due at least in part to the substantially constant size of the database's key.

Switching devices 202(1)-(N) generally represent any type or form of device, apparatus, system, and/or application capable of routing and/or forwarding information (such as data packets) among devices of a software-defined network. In some examples, switching devices 202(1)-(N) may be re-configured and/or re-programmed by controller 206. Examples of switching devices include, without limitation, network hubs, gateways, switches (such as OPENFLOW-enabled switches), bridges, routers, Field Programmable Gate Arrays (FPGAs), nodes, combinations of one or more of the same, or any other suitable switching devices.

Controller 206 generally represents any type or form of device, apparatus, and/or system capable of managing and/or controlling the movement of information (sometimes referred to as "traffic") within a software-defined network. In one example, controller 206 may include a dedicated special-purpose device capable of running software that determines how switching devices 202(1)-(N) are to handle certain data packets within software-defined network 200. In another example, controller 206 may include a virtual machine and/or other software executed on a general purpose computing device and/or networking device that facilitates the centralized management of software-defined network 200.

Computing devices 204(1)-(N) and 208(1)-(N) generally represent any type or form of computing device capable of reading computer-executable instructions. Examples of computing devices 204(1)-(N) and 208(1)-(N) include, without limitation, laptops, tablets, desktops, servers, cellular phones, Personal Digital Assistants (PDAs), multimedia players, embedded systems, switching devices, application servers, web servers, storage servers, deduplication servers, database servers, exemplary computing system 1100 in FIG. 11, combinations of one or more of the same, or any other suitable computing devices.

Figure 3:
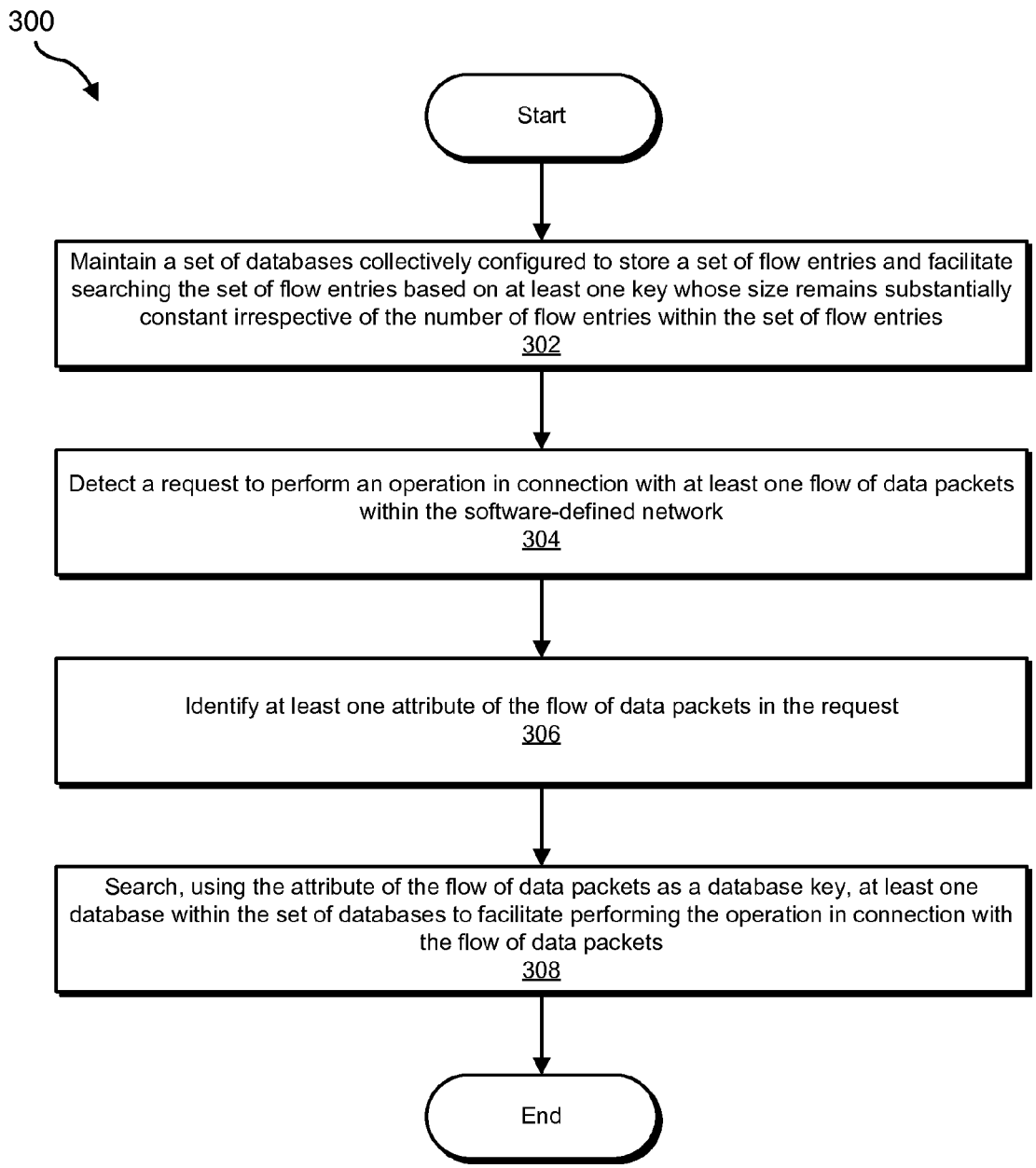
FIG. 3 is a flow diagram of an exemplary method for increasing the scalability of software-defined networks.

FIG. 3 is a flow diagram of an exemplary computer-implemented method 300 for increasing the scalability of software-defined networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 1110 in FIG. 11.

As illustrated in FIG. 3, at step 302 one or more of the systems described herein may maintain a set of databases that are collectively configured to store a set of flow entries. For example, at step 302 maintenance module 104 may, as part of switching device 202(1) in FIG. 2, maintain databases 120, which may be collectively configured to store flow entries 126 from FIG. 1. In this example, databases 120 may include core database 122 and auxiliary databases 128(1)-(N), which may facilitate searching flow entries 126 based at least in part on core database key 124 and auxiliary database keys 130(1)-(N), respectively. As will be described in greater detail below, the size of core database key 124 and/or auxiliary database keys 130(1)-(N) may remain substantially constant irrespective of the number of flow entries within flow entries 126.

The systems described herein may perform step 302 in a variety of ways. In some examples, maintenance module 104 may construct, build, and/or maintain databases 120 as directed by controller 206. For example, detection module 106 may, as part of switching device 202(1), detect a data packet received from computing device 204(1) within software-defined network 200. In response to the detection of this data packet, search module 110 may search core database 122 for a flow entry that indicates how to handle this data packet.

In the event that this is the first time that switching device 202(1) has encountered the data packet, core database 122 may not yet include a flow entry that corresponds and/or applies to the data packet (i.e., search module 110 may iterate through flow entries 126 within core database 122 without finding a flow entry whose match conditions match the corresponding attributes of the data packet). In response to this failed attempt to find a flow entry that indicates how to handle this data packet, maintenance module 104 may encapsulate the data packet and then direct switching device 202(1) to transfer the encapsulated data packet to controller 206 via a secure channel. Upon receiving the encapsulated data packet via this secure channel, controller 206 may analyze the contents of the encapsulated data packet and determine how switching device 202(1) is to handle the data packet (both now and in future encounters) based at least in part on this analysis. Controller 206 may then issue a request to switching device 202(1) via the secure channel to add a new flow entry to flow entries 126 that corresponds and/or applies to the data packet. Once detection module 106 detects that switching device 202(1) has received the request from controller 206 via the secure channel, maintenance module 104 may add the flow entry that corresponds and/or applies to the data packet to flow entries 126.

Maintenance module 104 may add a flow entry to flow entries 126 in a variety of ways. In one example, maintenance module 104 may add the flow entry to core database 122 only. Alternatively, maintenance module 104 may add the flow entry to both core database 122 and one or more of auxiliary databases 128(1)-(N). For example, maintenance module 104 may add the flow entry to both core database 122 and each of auxiliary databases 128(1)-(N).

In one example, maintenance module 104 may insert information indicating how to handle the data packet into the flow entry. Additionally or alternatively, maintenance module 104 may insert a reference to information indicating how to handle the data packet into the flow entry. For example, when adding a flow entry to one or more of auxiliary databases 128(1)-(N), rather than inserting information directly into the flow entry that indicates how to handle the data packet, maintenance module 104 may insert a reference that facilitates access to the flow entry added to core database 122. In this example, the reference may include a database key that defines the search path leading to the flow entry added to core database 122.

As detailed above, maintenance module 104 may configure at least one of databases 120 as a trie data structure. For example, in the embodiment illustrated in FIG. 4, core database 122 and auxiliary databases 128(2)-(4) may each be configured as a compressed trie. In contrast, auxiliary database 128(1) may be configured as a hash table.

Figure 5:
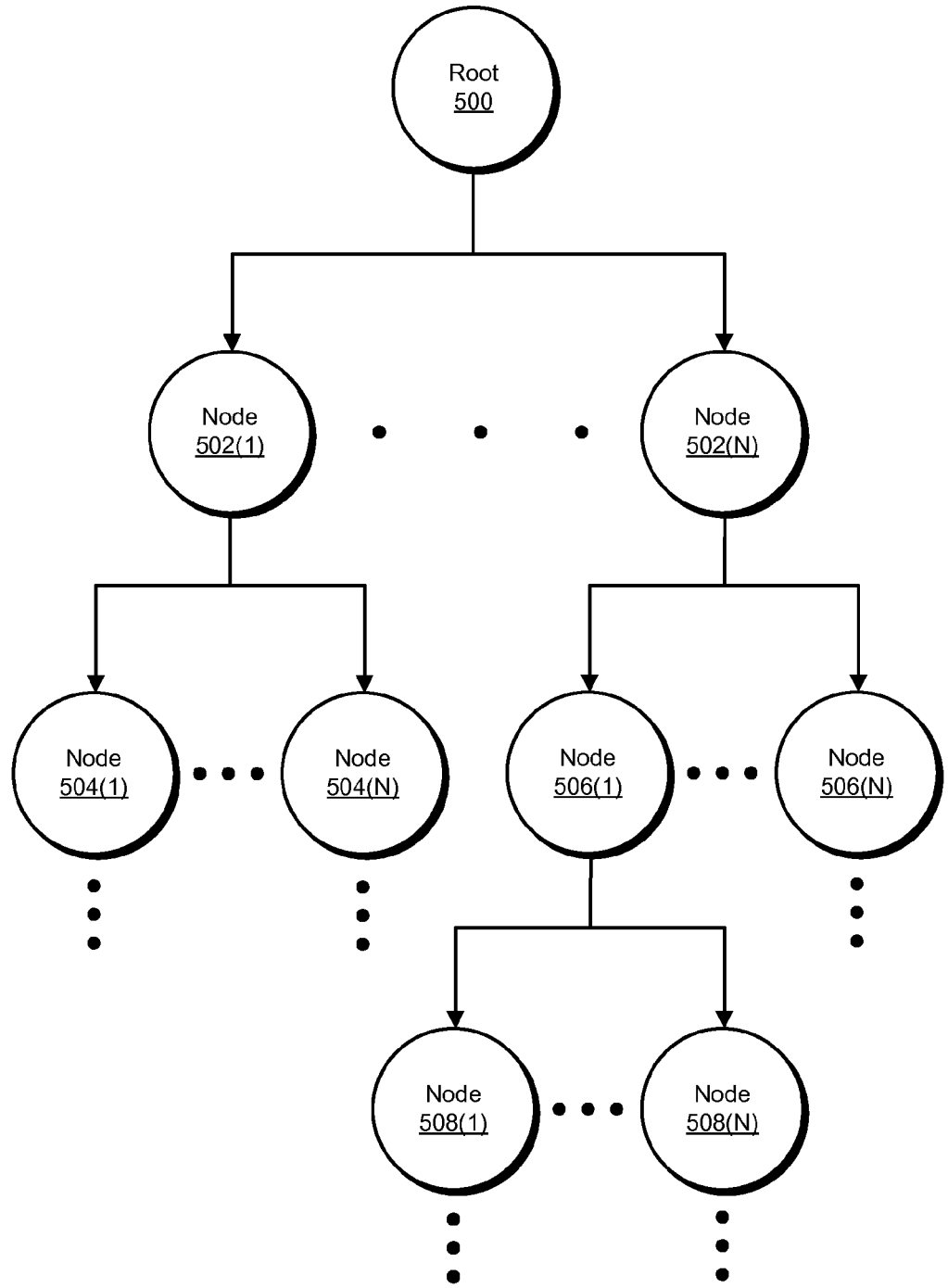
FIG. 5 is a block diagram of an exemplary data structure of one or more of the databases illustrated in FIG. 4.

FIG. 5 is an illustration of an exemplary trie data structure 510. As illustrated in this figure, trie data structure 510 may include a root node (in this example "Root 500"), a set of branch nodes that each represent an intermediary portion of at least one search path that leads to at least one flow entry (in this example, "Nodes 502(1)-(N)," "Nodes 504(1)-(N)," "Nodes 506(1)-(N)," and potentially "Nodes 508(1)-(N)" depending on whether additional nodes exist within trie data structure 510), and a set of element nodes that each include at least one flow entry (in this example, potentially "Nodes 508(1)-(N)" depending on whether additional nodes exist within trie data structure 510).

Figure 6:
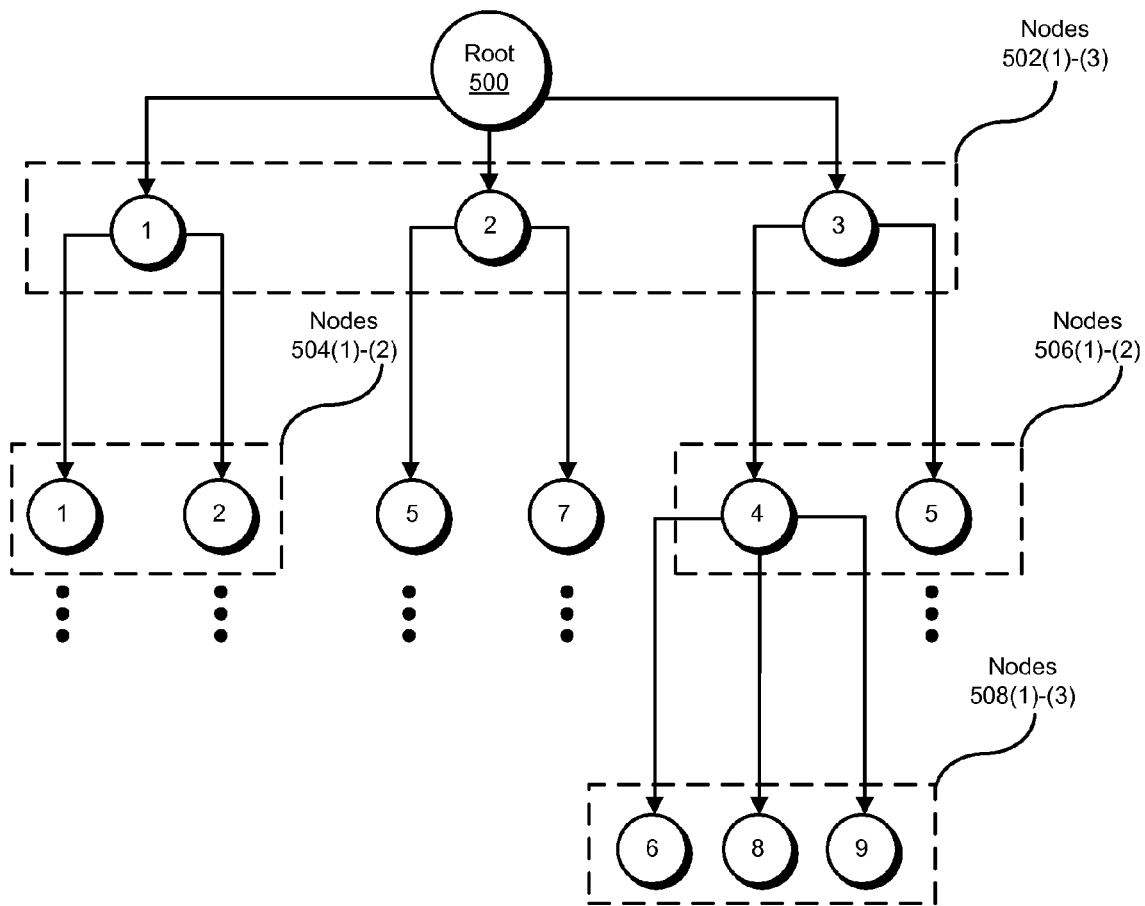
FIG. 6 is a block diagram of an exemplary core database for increasing the scalability of software-defined networks.

FIG. 6 is an exemplary illustration of core database 122 as a trie data structure. As illustrated in this figure, core database 122 may include nodes 502(1)-(N) that each correspond to a first character (in this example, "1," "2," or "3") within a database key, nodes 504(1)-(N) that each correspond to a second character (in this example, "1" or "2") within a database key whose first character is "1," nodes 506(1)-(N) that each correspond to a second character (in this example, "4" or "5") within a database key whose first character is "3," and nodes 508(1)-(N) that each correspond to a third character (in this example, "6," "8," or "9") within a database key whose first and second characters are "3" and "4," respectively.

Figure 4:
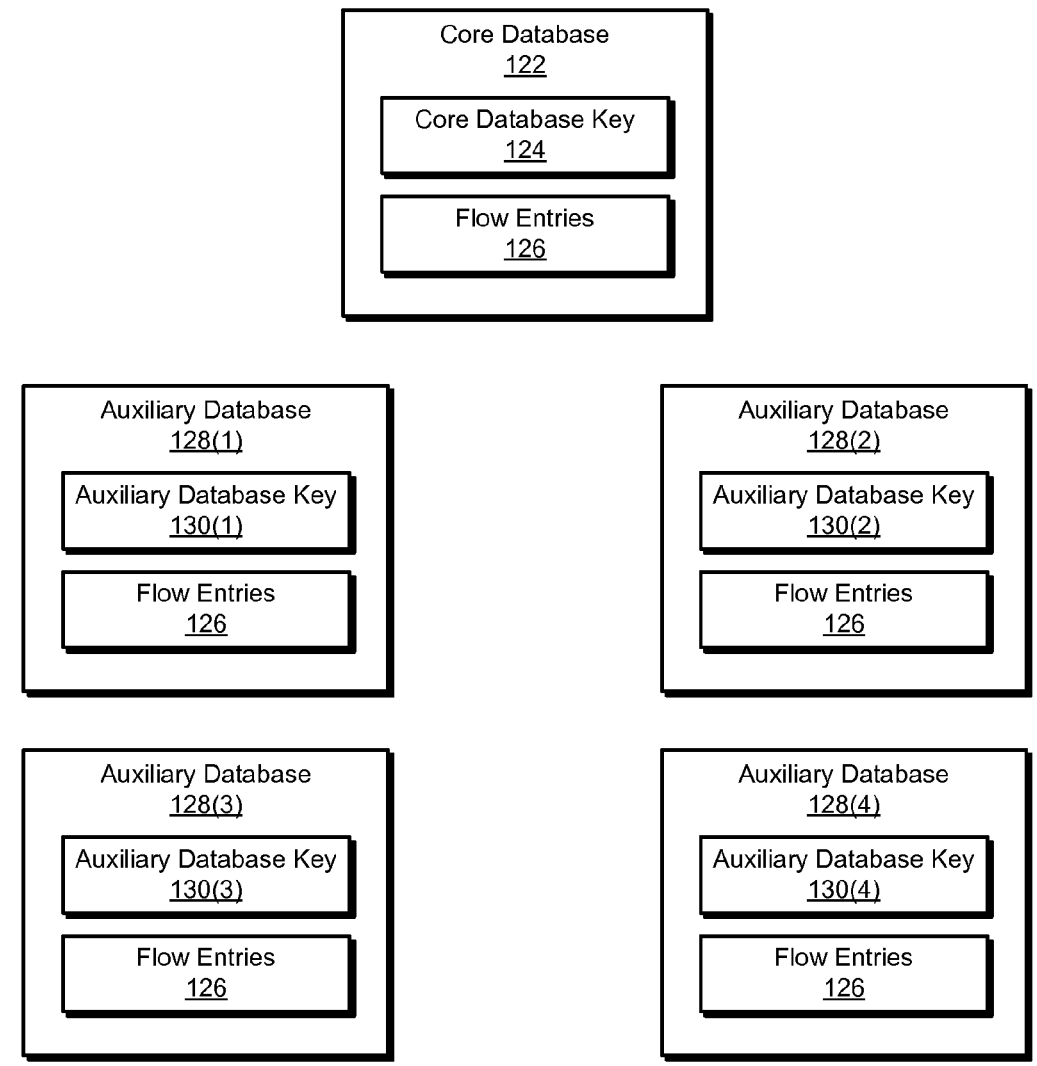
FIG. 4 is a block diagram of an exemplary set of databases for increasing the scalability of software-defined networks.

Since, in the example illustrated in FIG. 4, core database 122 and auxiliary databases 128(2)-(4) are each configured as a compressed trie, the size of core database key 124 and auxiliary database keys 130(2)-(4) may remain substantially constant as the number of flow entries within core database 122 and auxiliary databases 128(2)-(N) increases. In addition, since the size of core database key 124 and auxiliary database keys 130(2)-(4) remain substantially constant, the amount of time required to perform a database operation (such as looking up, adding, modifying, or deleting flow entries) on core database 122 and/or auxiliary databases 128 (2)-(N) may also remain substantially constant as the number of flow entries within core database 122 and auxiliary databases 128(2)-(N) increases.

In other words, since core database 122 and auxiliary databases 128(2)-(4) are each configured as a compressed trie, search module 110 may be able to search these databases in constant time (sometimes referred to as "O(constant)" or "O(1)"). By searching these databases in constant time, search module 110 may facilitate performing a database operation (such as looking up, adding, modifying, or deleting flow entries) in constant time. The phrase "constant time," as used herein, generally refers to any type or form of algorithmic time complexity in which the amount of time required to perform a certain operation on a database does not depend on the number of entries within the database.

Continuing with the example illustrated in FIG. 4, each database within databases 120 may have a different database key. For example, core database 122 may facilitate searching flow entries 126 based at least in part on core database key 124. In one example, core database key 124 may include at least one character that corresponds to a priority level of each flow entry within flow entries 126. In this example, the character that corresponds to the priority level may dictate a portion of the search path to traverse within core database 122.

The priority level of each flow entry within flow entries 126 may depend on the number of valid match conditions and/or wildcards of each flow entry. The phrase "valid match condition," as used herein, generally refers to any type or form of match condition of a flow entry that is used to determine whether a data packet or request matches the flow entry. In addition, the phrase "wildcard," as used herein, generally refers to any type or form of match condition of a flow entry that is not used to determine whether a data packet or request matches the flow entry.

In one example, as the number of valid match conditions decreases (and, in turn, the number of wildcards increases), the priority level may decrease. For example, in the event that the total number of match conditions is 14, each flow entry within flow entries 126 that includes 14 valid match conditions and 0 wildcards may have the highest priority level. In addition, each flow entry within flow entries 126 that includes the same 12 valid match conditions and the same 2 wildcards may have the same lower priority level as one another. Accordingly, various flow entries within flow entries 126 may have the same priority level as one another.

Core database key 124 may also include at least one match condition for flow entries 126. For example, core database key 124 may also include at least one character that corresponds to at least one match condition. In this example, the character that corresponds to the match condition may dictate a further portion of the search path to traverse within core database 122.

In the example illustrated in FIG. 4, auxiliary database 128(1) may facilitate searching flow entries 126 based at least in part on auxiliary database key 130(1). In one example, auxiliary database key 130(1) may include a 16-bit integer that corresponds to an order of priority of flow entries 126. In this example, since auxiliary database 128(1) is configured as a hash table, auxiliary database key 130(1) may essentially map auxiliary database 128(1) into a listing that identifies flow entries 126 in the order of priority. Accordingly, auxiliary database 128(1) may identify each flow entry within flow entries 126 that has the same priority level as one another.

Auxiliary database 128(2) in FIG. 4 may facilitate searching flow entries 126 based at least in part on auxiliary database key 130(2). In one example, auxiliary database key 130(2) may include at least one character that corresponds to at least one match condition. In this example, the character that corresponds to the match condition may dictate a portion of the search path to traverse within auxiliary database 130 (2).

In addition, auxiliary database key 130(2) may include at least one value of the match condition of flow entries 126. In one example, auxiliary database key 130(2) may also include at least one character that corresponds to the value of the match condition. For example, in the event that auxiliary database key 130(2) includes an IP source address as a match condition, auxiliary database key 130(2) may also include 10.10.10.5 as a value of that match condition. The character that corresponds to the value of that match condition may dictate a further portion of the search path to traverse within auxiliary database 130(2).

Auxiliary database 128(3) in FIG. 4 may facilitate searching flow entries 126 based at least in part on auxiliary database key 130(3). In one example, auxiliary database key 130(3) may include at least one character that corresponds to an ingress port of switching device 202(1). In this example, the character that corresponds to the ingress port may dictate which search path to traverse within auxiliary database 130 (3).

Auxiliary database 128(4) in FIG. 4 may facilitate searching flow entries 126 based at least in part on auxiliary database key 130(4). In one example, auxiliary database key 130(4) may include at least one character that corresponds to an egress port of switching device 202(1) (e.g., a port involved in an action identified in at least one flow entry within flow entries 126). In this example, the character that corresponds to the egress port may dictate which search path to traverse within auxiliary database 130(4).

Returning to FIG. 3, at step 304 one or more of the systems described herein may detect a request to perform an operation in connection with at least one flow of data packets. For example, at step 304 detection module 106 may, as part of switching device 202(1) in FIG. 2, detect request 132 to perform an operation in connection with a flow of data packets. Examples of such operations include, without limitation, strict operations, non-strict operations, looking up flow entries in at least one database, adding new flow entries to at least one database, modifying existing flow entries within at least one database, deleting existing flow entries from at least one database, obtaining statistics associated with flow entries within at least one database, providing statistics associated with flow entries to at least one device, combinations of one or more of the same, or any other suitable operations.

The phrase "strict operation," as used herein, generally refers to any type or form of database operation that requires matching both the priority level and each match condition of a flow entry. The phrase "non-strict operation," as used herein, generally refers to any type or form of database operation that only requires matching a subset of specified match conditions of a flow entry and specified values of those match conditions.

The systems described herein may perform step 304 in a variety of ways. In some examples, switching device 202(1) may receive request 132 from controller 206 via a secure channel. In such examples, as switching device 202(1) receives request 132 from controller 206, detection module 106 may detect request 132.

As illustrated in FIG. 3, at step 306 one or more of the systems described herein may identify at least one attribute of the flow of data packets in response to detecting the request. For example, at step 306 identification module 108 may, as part of switching device 202(1) in FIG. 2, identify at least one attribute of the flow of data packets in request 132. In this example, identification module 108 may initiate the process of identifying the attribute of the flow packets in response to the detection of request 132. Examples of such attributes include, without limitation, ingress ports, egress ports, Ethernet source addresses, Ethernet destination addresses, Ethernet types, VLAN identifiers, VLAN priority levels, IP source addresses, IP destination addresses, IP protocols, IP ToS bits, transport source ports, ICMP types, transport destination ports, ICMP codes, flow priority levels, combinations of one or more of the same, or any other suitable attributes.

The systems described herein may perform step 306 in a variety of ways. In some examples, identification module 108 may analyze request 132 to identify the attribute of the flow of data packets. For example, identification module 108 may scan request 132 for information that indicates the attribute of the flow of data packets. During this scan, identification module 108 may identify the information that indicates the attribute of the flow of data packets in request 132.

In some examples, identification module 108 may also analyze request 132 to identify at least one value of the attribute of the flow of data packets. For example, identification module 108 may scan request 132 for information that indicates the value of the attribute of the flow of data packets. During this scan, identification module 108 may identify the information that indicates the value of the attribute of the flow of data packets in request 132.

Additionally or alternatively, identification module 108 may analyze request 132 to identify the operation requested by request 132. For example, identification module 108 may scan request 132 for information that indicates the operation requested by request 132. During this scan, identification module 108 may identify the information that indicates the operation requested by request 132.

As illustrated in FIG. 3, at step 308 one or more of the systems described herein may search, using the attribute of the flow of data packets as a database key, at least one database within the set of databases to facilitate performing the operation in connection with the flow of data packets. For example, at step 308 search module 110 may, as part of switching device 202(1) in FIG. 2, search at least one database within databases 120 to facilitate performing the operation. In this example, search module 110 may use the attribute of the flow of data packets as the database key to search the database within databases 120. Search module 110 may initiate the process of searching the database using the attribute of the flow of data packets in response to the detection of request 132. As detailed above, the amount of time required to search the database within databases 120 may be independent of the number of flow entries within flow entries 126 due at least in part to the substantially constant size of the database's key.

The systems described herein may perform step 308 in a variety of ways. In some examples, search module 110 may determine which database within databases 120 to search in order to perform the operation requested by request 132. For example, identification module 108 may notify search module 110 of the operation requested by request 132. Upon receiving this notice, search module 110 may determine which database within databases 120 to search based at least in part on the operation requested by request 132.

In the event that the operation requested by request 132 is a strict operation, search module 110 may search core database 122 in FIG. 4 to perform the strict operation on core database 122. For example, identification module 108 may notify search module 110 of the priority level and attribute of the flow of data packets. Upon receiving this notice, search module 110 may search core database 122 using the priority of level and attribute of the flow of data packets as core database key 124. While searching core database 122, search module 110 may identify a position within flow entries 126 that corresponds to the priority level and attribute of the flow of data packets. After search module 110 has identified the position within flow entries 126, maintenance module 104 may perform the strict operation on core database 122 at the identified position within flow entries 126.

Figure 7:
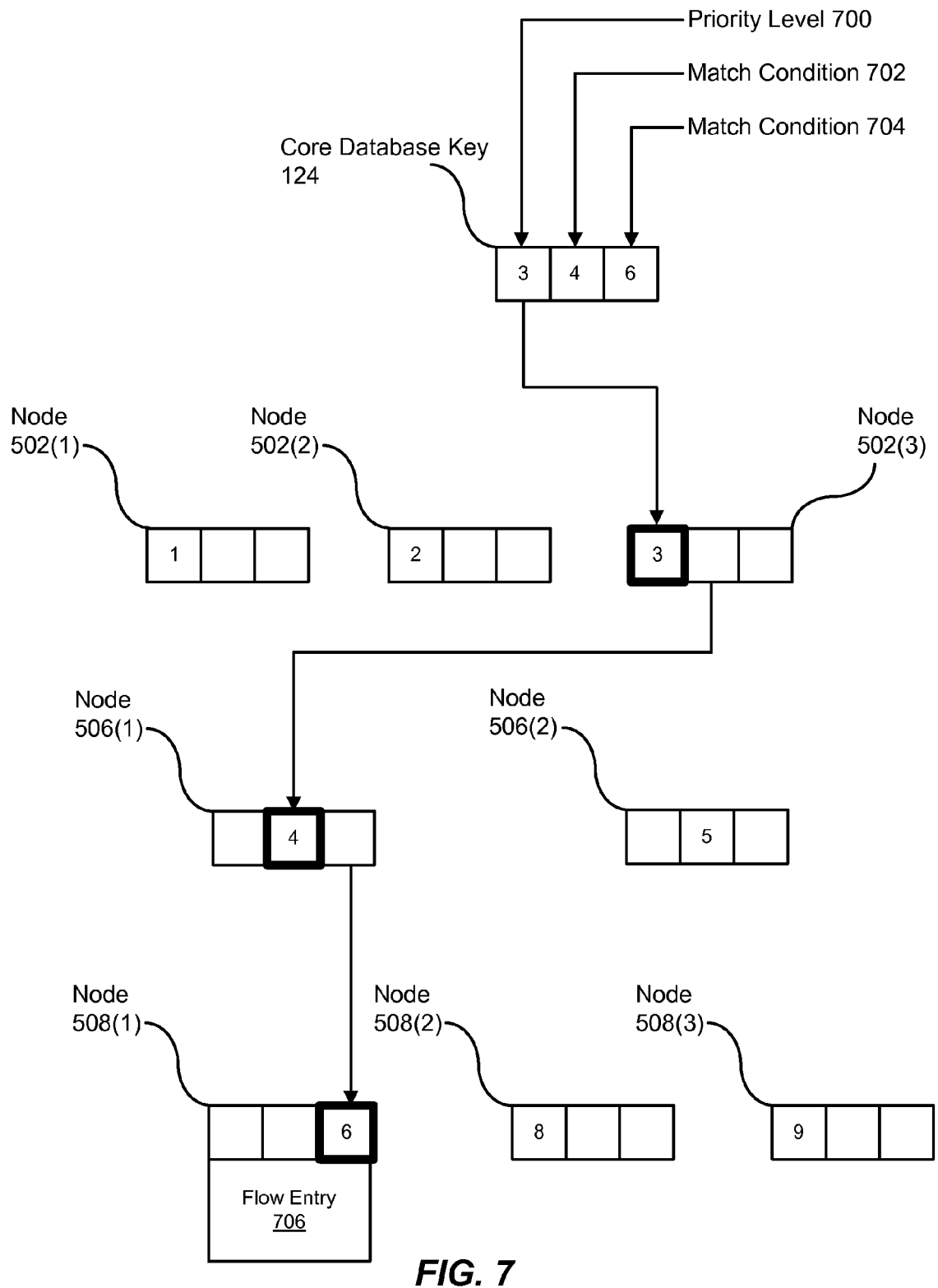
FIG. 7 is an illustration of an exemplary search path within the core database illustrated in FIG. 6.

FIG. 7 is an illustration of an exemplary search path within core database 122. As illustrated in FIG. 7, core database key 124 may include a sequence of characters (in this example, "346") that collectively represent the priority level of the flow of data packets (in this example, "priority level 700"), a first attribute or match condition of the flow of data packets (in this example, "match condition 702"), and a second attribute or match condition of the flow of data packets (in this example, "match condition 704").

Using the example illustrated in FIG. 7, search module 110 may identify "3" as the first character in core database key 124. Search module 110 may then begin traversing the search path defined by core database key 124 by advancing to node 502(3) within core database 122 since node 502(3) corresponds to the character "3" identified in core database key 124.

In addition, search module 110 may identify "4" as the second character in core database key 124. Search module 110 may then continue traversing the search path defined by core database key 124 by advancing to node 506(1) within core database 122 since node 506(1) corresponds to the character "4" identified in core database key 124.

Finally, search module 110 may identify "6" as the final character in core database key 124. Search module 110 may then finish traversing the search path defined by core database key 124 by advancing to node 508(1) within core database 122 since node 508(1) corresponds to the character "6" identified in core database key 124.

After search module 110 has advanced to node 508(1), maintenance module 104 may perform the strict operation on node 508(1) in accordance with request 132. For example, in the event that the strict operation is an add operation, maintenance module 104 may add flow entry 706 to node 508(1). In the event that the strict operation is a strict modify operation, maintenance module 104 may modify flow entry 706 in node 508(1). In the event that the strict operation is a strict delete operation, maintenance module 104 may delete flow entry 706 from node 508(1).

As illustrated in FIG. 8, flow entry 706 may include information that identifies the priority level of the flow of data packets (in this example, "3"), the attributes of the flow of data packets (in this example, "INGRESS PORT" and "VLAN ID"), the values of the attributes of the flow of data packets (in this example, "4" and "6"), an action to perform on matching data packets (in this example, "Forward Data Packets to Computing Device 204(N)), and associated statistics (in this example, "RECEIVED PACKETS: 20000," "RECEIVED BYTES: 1500000," and "DURATION: 47000000").

In the event that the operation requested by request 132 is an add operation that requires no flow overlap, search module 110 may search auxiliary database 128(1) in FIG. 4 to determine whether the add operation may result in flow overlap. The phrase "flow overlap," as used herein, generally refers to any type or form of switch and/or database configuration in which a single data packet may match multiple flow entries that have the same priority level.

In this example, search module 110 may identify a priority level of the flow of data packets in request 132. Upon identifying the priority level of the flow of data packets in request 132, search module 110 may search auxiliary database 128(1) in FIG. 4 using the priority of level of the flow of data packets as auxiliary database key 130(1). Search module 110 may then determine whether the add operation may result in flow overlap by comparing each valid match condition of the flow of data packets with the match conditions of the flow entries that have the same priority level. In other words, search module 110 may determine whether flow entries 126 already include a flow entry that has the same priority level and each valid match condition as the flow of data packets.

In the event that flow entries 126 already include such a flow entry, search module 110 may reject the add operation due at least in part to the potential flow overlap. In response to this rejection, maintenance module 104 may issue an error report that details the rejection and then direct switching device 202(1) to transfer the error report to controller 206 via the secure channel.

In the event that flow entries 126 do not yet include such a flow entry, search module 110 may search core database 122 using the priority level and each valid match condition of the flow of data packets as core database key 124. While searching core database 122, search module 110 may identify a position within flow entries 126 that corresponds to the priority level and each valid match condition of the flow of data packets. After search module 110 has identified the position within flow entries 126, maintenance module 104 may perform the add operation by inserting the flow entry into core database 122 at the identified position within flow entries 126.

In the event that the operation requested by request 132 is a non-strict operation, search module 110 may search auxiliary database 128(2) in FIG. 4 to facilitate performing the non-strict operation on all matching flow entries within core database 122. For example, identification module 108 may notify search module 110 of the priority level and value of the flow of data packets. Upon receiving this notice, search module 110 may search auxiliary database 128(2) using the priority of level and value of the flow of data packets as auxiliary database key 130(2). While searching auxiliary database 128 (2), search module 110 may identify each flow entry within flow entries 126 whose match condition and value of the match condition are respectively matched by the attribute and value of the attribute of the flow of data packets. Maintenance module 104 may then perform the non-strict operation in accordance with request 132.

Figure 9:
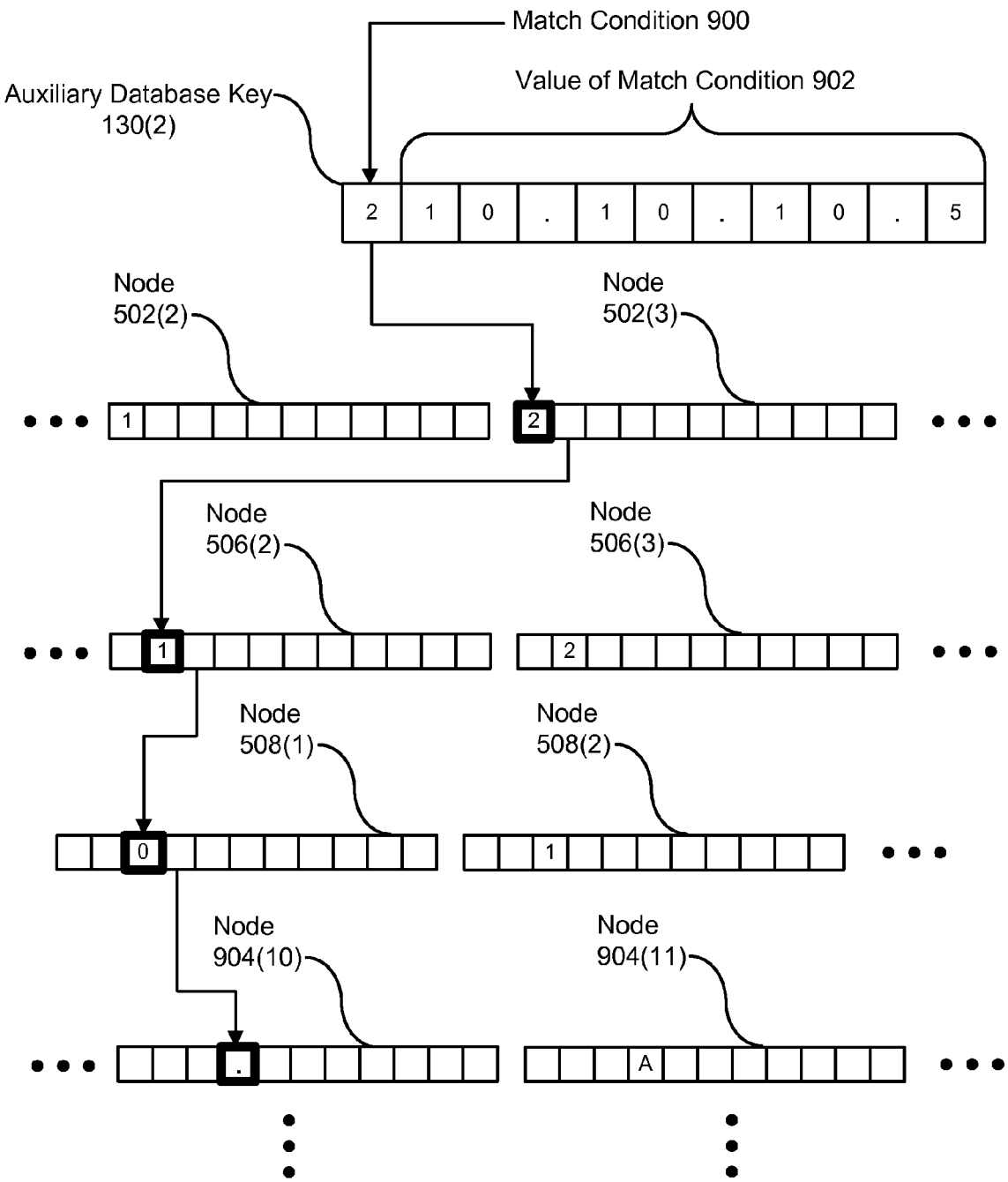
FIG. 9 is an illustration of an exemplary search path within an auxiliary database for increasing the scalability of software-defined networks.

FIG. 9 is an illustration of an exemplary search path within auxiliary database 128(2). As illustrated in FIG. 9, auxiliary database key 130(2) may include a sequence of characters (in this example, "210.10.10.5") that collectively represent a source IP address match condition (in this example, "Match Condition 900") and a value of the source IP address match condition (in this example, "Value of Match Condition 902").

Using the example illustrated in FIG. 9, search module 110 may identify "2" as the first character in auxiliary database key 130(2). Search module 110 may then begin traversing the search path defined by auxiliary database key 130(2) by advancing to node 502(3) within auxiliary database 128(2) since node 502(3) corresponds to the character "2" identified in auxiliary database key 130(2).

In addition, search module 110 may identify "1" as the second character in auxiliary database key 130(2). Search module 110 may then continue traversing the search path defined by auxiliary database key 130(2) by advancing to node 506(2) within auxiliary database 128(2) since node 506(2) corresponds to the second character "1" identified in auxiliary database key 130(2).

Search module 110 may also identify "0" as the third character in auxiliary database key 130(2). Search module 110 may then continue traversing the search path defined by auxiliary database key 130(2) by advancing to node 508(1) within auxiliary database 128(2) since node 508(1) corresponds to the third character "0" identified in auxiliary database key 130(2).

Search module 110 may further identify "." as the fourth character in auxiliary database key 130(2). Search module 110 may then continue traversing the search path defined by auxiliary database key 130(2) by advancing to node 904(10) within auxiliary database 128(2) since node 904(10) corresponds to the fourth character "." identified in auxiliary database key 130(2).

The search path defined by auxiliary database key 130(2) within auxiliary database 128(2) may include various other nodes (not illustrated in FIG. 9) that correspond to the later "10.10.5" portion of auxiliary database key 130(2). Search module 110 may continue traversing the search path defined by auxiliary database key 130(2) until advancing to the element node that represents the final character "5" identified in auxiliary database key 130(2).

Figure 10:
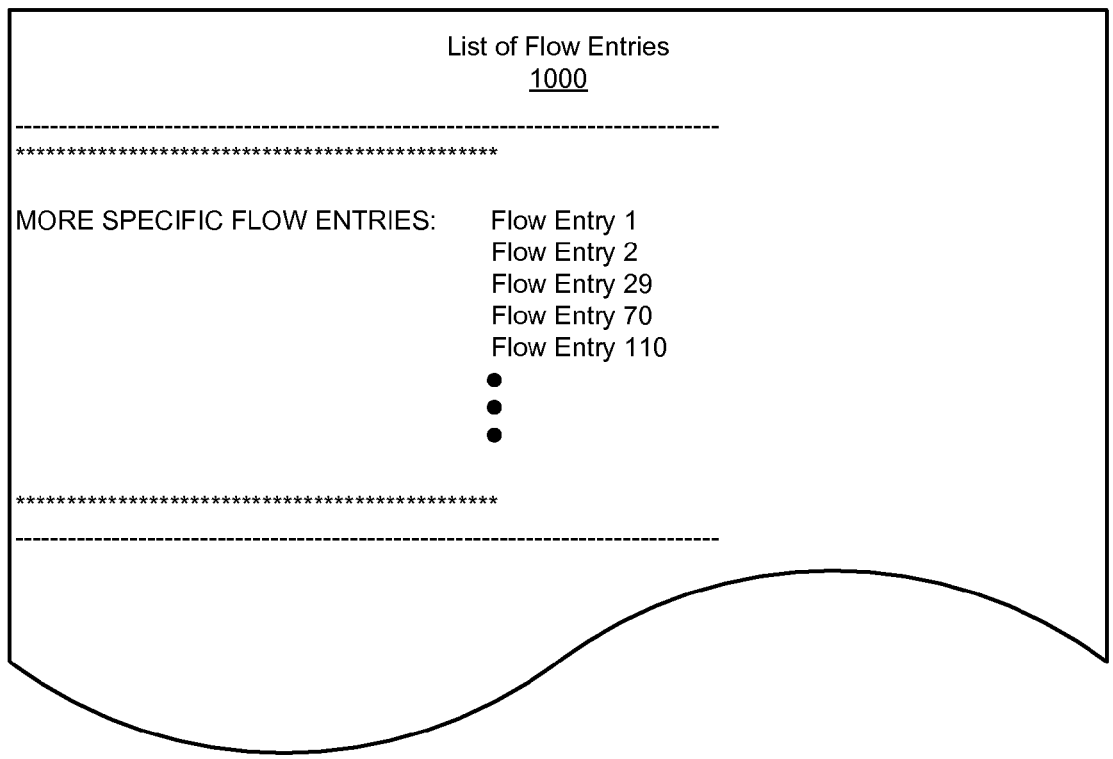
FIG. 10 is an illustration of an exemplary list of flow entries within the auxiliary database illustrated in FIG. 9.

Upon advancing to this element node, search module 110 may identify a list of flow entries 1000. As illustrated in FIG. 10, list of flow entries 1000 may identify flow entries within flow entries 126 that are more specific than request 132 (in this example, "Flow Entry 1," "Flow Entry 2," "Flow Entry 29," "Flow Entry 70," and "Flow Entry 110"). The phrase "more specific," as used herein, generally refers to any type of form of flow entry whose match conditions and values of those match conditions are respectively matched by attributes and values of those attributes identified in a non-strict request.

In the event that the non-strict operation is a non-strict modify or delete operation, search module 110 may search core database 122 for the flow entries included in list of flow entries 1000. For example, search module 110 may search core database 122 using the priority levels and match conditions of those flow entries as core database key 124. As search module 110 identifies each of those flow entries within core database 122, maintenance module 104 may perform the non-strict modify or delete operation on each of those flow entries within core database 122 in accordance with request 132.

In the event that request 132 is a non-strict request that identifies multiple attributes and values of those attributes, search module 110 may perform multiple searches on auxiliary database 128(2) using a different attribute and value pairing as auxiliary database key 130(2) during each search. As a result, search module 110 may identify a different list of flow entries during each search. Upon completing the multiple searches, search module 110 may perform a join operation on the different lists of flow entries to determine which flow entries are common to all of the different lists.

In one example, search module 110 may perform the join operation by identifying the list within the different lists that includes the fewest number of flow entries. Upon identifying the list that includes the fewest number of flow entries, search module 110 may compare this list with each different list identified during the multiple searches. Search module 110 may then determine which flow entries are common to all of the different lists based at least in part on this comparison.

Upon determining which flow entries are common to all of the different lists, search module 110 may search core database 122 for those flow entries. For example, search module 110 may search core database 122 using the priority levels and match conditions of those flow entries as core database key 124. As search module 110 identifies each of those flow entries within core database 122, maintenance module 104 may perform the non-strict operation on each of those flow entries within core database 122 in accordance with request 132.

In the event that the non-strict operation is a statistics operation, search module 110 may search core database 122 for the statistics associated with the flow entries included in list of flow entries 100. For example, search module 110 may search core database 122 using the priority levels and match conditions of those flow entries as core database key 124. As search module 110 identifies each of those flow entries within core database 122, maintenance module 104 may obtain the requested statistics from those flow entries within core database 122. Maintenance module 104 may then direct switching device 202(1) to transfer the requested statistics to controller 206 in accordance with request 132.

In the event that the operation requested by request 132 corresponds and/or applies to all flow entries that have a specific ingress port match condition, search module 110 may search auxiliary database 128(3) in FIG. 4 to facilitate performing the operation on all matching flow entries within core database 122. For example, identification module 108 may notify search module 110 of the specific ingress port match condition. Upon receiving this notice, search module 110 may search auxiliary database 128(3) using the specific ingress port as auxiliary database key 130(3). While searching auxiliary database 128(3), search module 110 may identify each flow entry within flow entries 126 that has the specific ingress port match condition.

Search module 110 may then search core database 122 for the flow entries that have the specific ingress port match condition using the priority levels and match conditions of those flow entries as core database key 124. As search module 110 identifies each of those flow entries within core database 122, maintenance module 104 may perform the operation by modifying or deleting each of those flow entries in accordance with request 132.

In the event that the operation requested by request 132 corresponds and/or applies to all flow entries whose actions involve a specific egress port, search module 110 may search auxiliary database 128(4) in FIG. 4 to facilitate performing the operation on all matching flow entries within core database 122. For example, identification module 108 may notify search module 110 of the specific egress port. Upon receiving this notice, search module 110 may search auxiliary database 128(4) using the specific egress port as auxiliary database key 130(4). While searching auxiliary database 128(4), search module 110 may identify each flow entry within flow entries 126 whose action involves the specific egress port.

Search module 110 may then search core database 122 for the flow entries whose actions involve the specific egress port using the priority levels and match conditions of those flow entries as core database key 124. As search module 110 identifies each of those flow entries within core database 122, maintenance module 104 may perform the operation by modifying or deleting each of those flow entries in accordance with request 132.

In some examples, detection module 106 may detect data packet 134 within software-defined network 200. For example, switching device 202(1) may receive data packet 134 from computing device 204(1) within software-defined network 200. In this example, as switching device 202(1) receives data packet 134 from computing device 204(1), detection module 106 may detect data packet 134.

In response to the detection of data packet 134, search module 110 may search core database 122 for a flow entry that indicates how to handle data packet 134. For example, search module 110 may iterate through flow entries 126 within core database 122 in the order of priority. In this example, while iterating through flow entries 126 within core database 122, search module 110 may identify the highest-priority flow entry that corresponds and/or applies to data packet 134.

More specifically, search module 110 may identify each valid match condition of the flow entry and then compare one or more attributes of data packet 134 with each valid match condition of the flow entry. Search module 110 may determine that the attributes of data packet 134 match each valid match condition of the flow entry based at least in part on this comparison. Search module 110 may then determine that the flow entry corresponds and/or applies to data packet 134 since the attributes of data packet 134 match each valid match condition of the flow entry. After search module 110 has determined that the flow entry corresponds and/or applies to data packet 134, action module 112 may perform at least one action identified in the flow entry on data packet 134.

As explained above, by maintaining flow entries 126 within databases 120, switching device 202(1) may direct network traffic within software-defined network 200 based on the same. In addition, by configuring core database 122 and/or one or more of auxiliary databases 128(1)-(N) within databases 120 as trie data structures, switching device 202(1) may be able to perform a database operation (such as looking up, adding, modifying, or deleting flow entries) on these databases in the same amount of time irrespective of the number of flow entries within these databases. This may in turn enable switching device 202(1) to maintain a consistent level of performance, even as the number of flow entries within databases 120 increase, thereby increasing the scalability of software-defined network 200.

Figure 11:
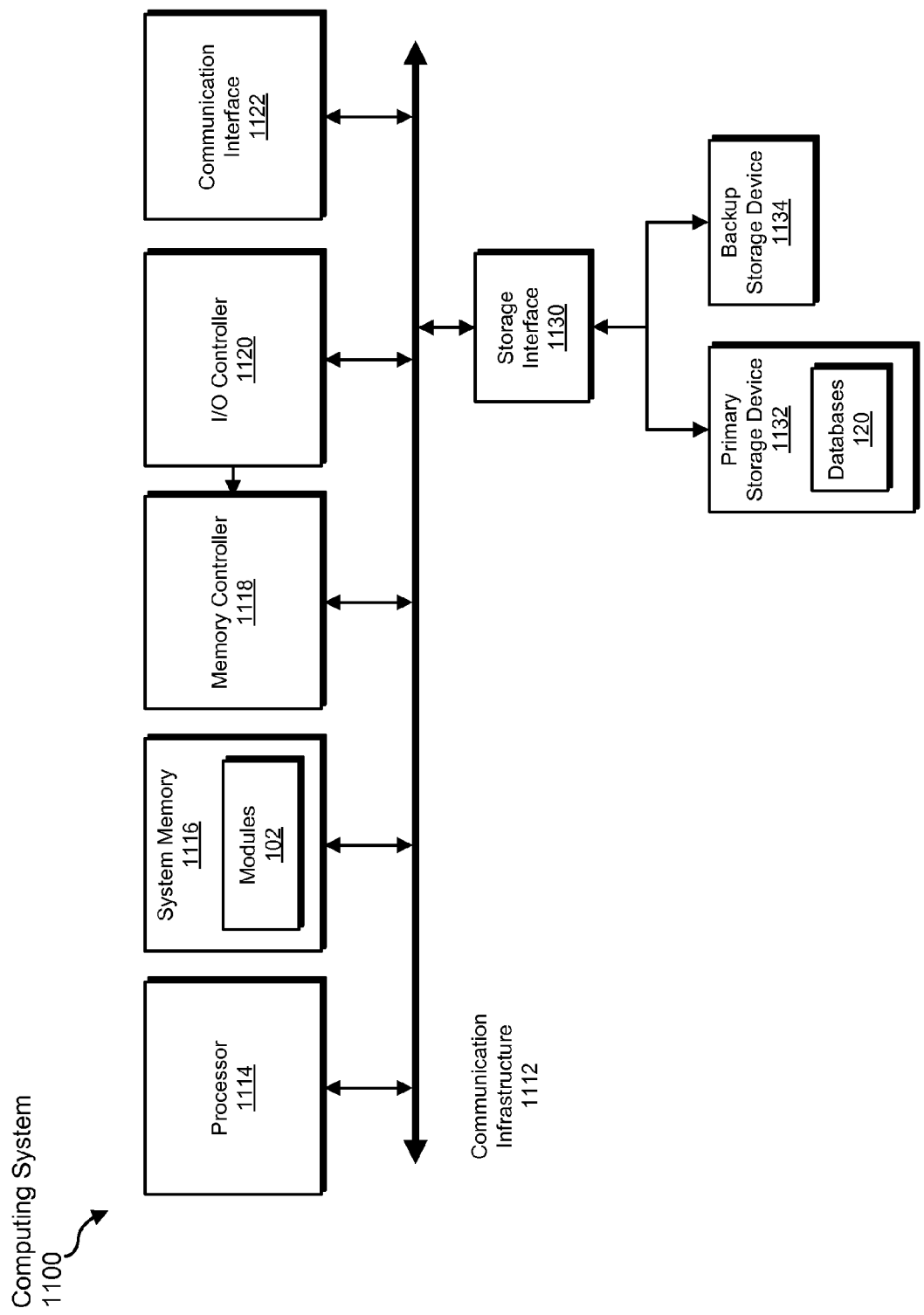
FIG. 11 is a block diagram of an exemplary computing system capable of implementing and/or being used in connection with one or more of the embodiments described and/or illustrated herein.

FIG. 11 is a block diagram of an exemplary computing system 1100 capable of implementing and/or being used in connection with one or more of the embodiments described and/or illustrated herein. In some embodiments, all or a portion of computing system 1100 may perform and/or be a means for performing, either alone or in combination with other elements, one or more of the steps described in connection with FIG. 3. All or a portion of computing system 1100 may also perform and/or be a means for performing and/or implementing any other steps, methods, or processes described and/or illustrated herein.

Computing system 1100 broadly represents any type or form of computing device, apparatus, or system, including a single or multi-processor computing device or system capable of executing computer-readable instructions. Examples of computing system 1100 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1100 may be programmed, configured, and/or otherwise designed to comply with one or more networking protocols. According to certain embodiments, computing system 1100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1100 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1100 may include various network and/or computing components. For example, computing system 1100 may include at least one processor 1114 and a system memory 1116. Processor 1114 generally represents any type or form of processing unit capable of processing data or interpreting and executing instructions. Processor 1114 may represent an application-specific integrated circuit (ASIC), a system on a chip (e.g., a network processor), a hardware accelerator, a general purpose processor, and/or any other suitable processing element.

Processor 1114 may process data according to one or more of the networking protocols discussed above. For example, processor 1114 may execute or implement a portion of a protocol stack, may process packets, may perform memory operations (e.g., queuing packets for later processing), may execute end-user applications, and/or may perform any other processing tasks.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1100 may include both a volatile memory unit (such as, for example, system memory 1116) and a non-volatile storage device (such as, for example, primary storage device 1132, as described in detail below).

In some embodiments, system memory 1116 may be implemented as shared memory and/or distributed memory in a network device. System memory 1116 may also store packets and/or other information used in networking operations. In one example, one or more of modules 102 from FIG. 1 may be loaded into system memory 1116.

In certain embodiments, exemplary computing system 1100 may also include one or more components or elements in addition to processor 1114 and system memory 1116. For example, as illustrated in FIG. 11, computing system 1100 may include a memory controller 1118, an Input/Output (I/O) controller 1120, and a communication interface 1122, each of which may be interconnected via communication infrastructure 1112. Communication infrastructure 1112 generally represents any type or form of infrastructure capable of facilitating communication between one or more components of a computing device. Examples of communication infrastructure 1112 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1118 generally represents any type or form of device capable of handling memory or data or controlling communication between one or more components of computing system 1100. For example, in certain embodiments memory controller 1118 may control communication between processor 1114, system memory 1116, and I/O controller 1120 via communication infrastructure 1112. In some embodiments, memory controller 1118 may include a Direct Memory Access (DMA) unit that may transfer data (e.g., packets) to or from a link adapter.

I/O controller 1120 generally represents any type or form of device or module capable of coordinating and/or controlling the input and output functions of a computing device. For example, in certain embodiments I/O controller 1120 may control or facilitate transfer of data between one or more elements of computing system 1100, such as processor 1114, system memory 1116, communication interface 1122, and storage interface 1130.

Communication interface 1122 broadly represents any type or form of communication device or adapter capable of facilitating communication between exemplary computing system 1100 and one or more additional devices. For example, in certain embodiments communication interface 1122 may facilitate communication between computing system 1100 and a private or public network including additional computing systems. Examples of communication interface 1122 include, without limitation, a link adapter, a wired network interface (such as a network interface card), a wireless network interface (such as a wireless network interface card), and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1122 may also represent a host adapter configured to facilitate communication between computing system 1100 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also enable computing system 1100 to engage in distributed or remote computing. For example, communication interface 1122 may receive instructions from a remote device or send instructions to a remote device for execution.

As illustrated in FIG. 11, exemplary computing system 1100 may also include a primary storage device 1132 and/or a backup storage device 1134 coupled to communication infrastructure 1112 via a storage interface 1130. Storage devices 1132 and 1134 generally represent any type or form of storage device or medium capable of storing data and/or other computer-readable instructions. For example, storage devices 1132 and 1134 may represent a magnetic disk drive (e.g., a so-called hard drive), a solid state drive, a floppy disk drive, a magnetic tape drive, an optical disk drive, a flash drive, or the like. Storage interface 1130 generally represents any type or form of interface or device for transferring data between storage devices 1132 and 1134 and other components of computing system 1100. In one example, databases 120 from FIG. 1 may be stored in primary storage device 1132.

In certain embodiments, storage devices 1132 and 1134 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1134 may also include other similar structures or devices for allowing computer software, data, or other computer-readable instructions to be loaded into computing system 1100. For example, storage devices 1132 and 1134 may be configured to read and write software, data, or other computer-readable information. Storage devices 1132 and 1134 may be a part of computing system 1100 or may be separate devices accessed through other interface systems.

Many other devices or subsystems may be connected to computing system 1100. Conversely, all of the components and devices illustrated in FIG. 11 need not be present to practice the embodiments described and/or illustrated herein. The devices and subsystems referenced above may also be interconnected in different ways from those shown in FIG. 11. Computing system 1100 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   maintaining a set of databases that are collectively configured to:
      store a set of flow entries that collectively direct network traffic within a software-defined network;
      facilitate searching the set of flow entries based at least in part on at least one key whose size remains constant irrespective of the number of flow entries within the set of flow entries;
   detecting a request to perform an operation in connection with at least one flow of data packets within the software-defined network;
   in response to detecting the request:
      identifying at least one attribute of the flow of data packets in the request, wherein the attribute of the flow of data packets is included in a header of at least one data packet within the flow of data packets;
      searching, using the attribute of the flow of data packets as a database key, at least one database within the set of databases to facilitate performing the operation in connection with the flow of data packets, wherein the amount of time required to search the database is independent of the number of flow entries within the set of flow entries due at least in part to the constant size of the database's key, wherein:
         the database within the set of databases comprises a trie data structure;
         searching the database within the set of databases comprises traversing the trie data structure by:
            identifying at least one character within the attribute of the flow of data packets;
            advancing to a node within the trie data structure that corresponds to the character identified within the attribute of the flow of data packets.

2. The method of claim 1, wherein maintaining the set of databases comprises maintaining:
   a core database whose key includes:
      an order of priority of the set of flow entries;
      at least one match condition of the set of flow entries;
   at least one auxiliary database whose key is different than the core database's key.

3. The method of claim 2, wherein:
   the core database comprises a trie data structure;
   searching the database within the set of databases comprises:
      identifying a priority level of the flow of data packets in the request;
      identifying at least one attribute of the flow of data packets in the request;
      searching the core database using the priority level and attribute of the flow of data packets as the core database's key;
      while searching the core database, identifying a position within the set of flow entries that corresponds to the priority level and attribute of the flow of data packets;
   further comprising responding to the request to perform the operation in connection with the flow of data packets by performing the operation on the core database at the identified position within the set of flow entries.

4. The method of claim 2, wherein:
   the auxiliary database comprises a data structure whose key includes the order of priority of the set of flow entries;
   searching the database within the set of databases comprises:
      identifying a priority level of the flow of data packets in the request;
      identifying each valid match condition of the flow of data packets in the request;
      searching the auxiliary database using the priority level of the flow of data packets as the auxiliary database's key;
      determining, based at least in part on searching the auxiliary database, that the set of flow entries does not yet include a flow entry that has the priority level and each valid match condition of the flow of data packets;
   further comprising responding to the request to perform the operation in connection with the flow of data packets by performing an add operation on the core database by:
      searching the core database using the priority level and each valid match condition of the flow of data packets as the core database's key;
      while searching the core database, identifying a position within the set of flow entries that corresponds to the priority level and each valid match condition of the flow of data packets;
      inserting the flow entry into the core database at the identified position within the set of flow entries.

5. The method of claim 2, wherein:
   the auxiliary database comprises a trie data structure whose key includes:
      at least one match condition of the set of flow entries;
      at least one value of the match condition of the set of flow entries;
   searching the database within the set of databases comprises:
      identifying at least one attribute of the flow of data packets in the request;

identifying at least one value of the attribute of the flow of data packets in the request;
searching the auxiliary database using the attribute of the flow of data packets and the value of the attribute of the flow of data packets as the auxiliary database's key;

further comprising responding to the request to perform the operation in connection with the flow of data packets by performing a modify operation on the core database by:
identifying, based at least in part on searching the auxiliary database, each flow entry within the set of flow entries whose match condition and value of the match condition are respectively matched by the attribute of the flow of data packets and the value of the attribute of the flow of data packets;
modifying, based at least in part on the request, each flow entry within the core database whose match condition and value of the match condition are respectively matched by the attribute of the flow of data packets and the value of the attribute of the flow of data packets.

6. The method of claim 2, wherein:
the auxiliary database comprises a trie data structure whose key includes:
at least one match condition of the set of flow entries;
at least one value of the match condition of the set of flow entries;
searching the database within the set of databases comprises:
identifying at least one attribute of the flow of data packets in the request;
identifying at least one value of the attribute of the flow of data packets in the request;
searching the auxiliary database using the attribute of the flow of data packets and the value of the attribute of the flow of data packets as the auxiliary database's key;

further comprising responding to the request to perform the operation in connection with the flow of data packets by performing a statistics operation on the core database by:
identifying, based at least in part on searching the auxiliary database, each flow entry within the set of flow entries whose match condition and value of the match condition are respectively matched by the attribute of the flow of data packets and the value of the attribute of the flow of data packets;
obtaining, from the core database, at least one statistic of each flow entry whose match condition and value of the match condition are respectively matched by the attribute of the flow of data packets and the value of the attribute of the flow of data packets;
providing, based at least in part on the request, the statistic of each flow entry to at least one computing system within the software-defined network.

7. The method of claim 2, wherein:
the auxiliary database comprises a trie data structure whose key includes a network port within the software-defined network;
searching the database within the set of databases comprises:
identifying a specific network port associated with the flow of data packets in the request;
searching the auxiliary database using the specific network port as the auxiliary database's key;

further comprising responding to the request to perform the operation in connection with the flow of data packets by performing a modify operation on the core database by:
identifying, based at least in part on searching the auxiliary database, each flow entry within the set of flow entries that is associated with the specific network port;
modifying, based at least in part on the request, each flow entry within the core database that is associated with the specific network port.

8. The method of claim 7, wherein modifying each flow entry within the core database that is associated with the specific network port comprises deleting each flow entry associated with the specific network port from the core database.

9. The method of claim 2, wherein searching the database within the set of databases comprises:
searching the auxiliary database using the attribute of the flow of data packets as the auxiliary database's key;
identifying at least one flow entry within the auxiliary database that identifies at least one other attribute of the flow of data packets.

10. The method of claim 9, wherein the attribute and the other attribute of the flow of data packets include:
a priority level of the flow of data packets;
at least one match condition of the flow of data packets.

11. The method of claim 10, further comprising, in response to identifying the flow entry within the auxiliary database:
searching, using the priority level and match condition of the flow of data packets as the core database's key, the core database for at least one flow entry that identifies at least one action to perform on the flow of data packets;
identifying the flow entry within the core database that identifies the action to perform on the flow of data packets.

12. The method of claim 2, further comprising:
detecting at least one data packet within the software-defined network;
identifying, by iterating through the set of flow entries within the core database in the order of priority, at least one flow entry that identifies at least one action to perform on the data packet;
performing the identified action on the data packet.

13. The method of claim 12, wherein identifying the flow entry that identifies the action to perform on the data packet comprises:
identifying each valid match condition of a flow entry within the set of flow entries;
determining that one or more attributes of the data packet match each valid match condition of the flow entry by comparing the attributes of the data packet with each valid match condition of the flow entry;
determining that the flow entry corresponds to the data packet since the attributes of the data packet match each valid match condition of the flow entry.

14. The method of claim 1, wherein traversing the trie data structure comprises:
identifying a final character within the attribute of the flow of data packets;
advancing to another node within the trie data structure that corresponds to the final character identified within the attribute of the flow of data packets;
upon advancing to the other node that corresponds to the final character identified within the attribute of the flow of data packets, performing the operation in connection with the flow of data packets.

15. The method of claim 14, wherein performing the operation in connection with the flow of data packets comprises adding the flow entry to the set of flow entries based at least in part on the request.

16. The method of claim 14, wherein performing the operation in connection with the flow of data packets comprises at least one of:
- modifying the flow entry within the set of flow entries based at least in part on the request;
- deleting the flow entry from the set of flow entries based at least in part on the request.

17. A system comprising:
- a maintenance module, stored in memory, that maintains a set of databases that are collectively configured to:
  - store a set of flow entries that collectively direct network traffic within a software-defined network;
  - facilitate searching the set of flow entries based at least in part on at least one key whose size remains constant irrespective of the number of flow entries within the set of flow entries;
- a detection module, stored in memory, that detects a request to perform an operation in connection with at least one flow of data packets within the software-defined network;
- an identification module, stored in memory, that identifies at least one attribute of the flow of data packets in the request, wherein the attribute of the flow of data packets is included in a header of at least one data packet within the flow of data packets;
  - a search module that searches, using the attribute of the flow of data packets as a database key, at least one database within the set of databases to facilitate performing the operation in connection with the flow of data packets, wherein the amount of time required to search the database is independent of the number of flow entries within the set of flow entries due at least in part to the constant size of the database's key, wherein:
    - the database within the set of databases comprises a trie data structure;
    - searching the database within the set of databases comprises traversing the trie data structure by:
      - identifying at least one character within the attribute of the flow of data packets;
      - advancing to a node within the trie data structure that corresponds to the character identified within the attribute of the flow of data packets;
- at least one physical processor configured to execute the maintenance module, the detection module, the identification module, and the search module.

18. An apparatus comprising:
- memory configured to store a set of databases that:
  - include a set of flow entries that collectively direct network traffic within a software-defined network;
  - facilitate searching the set of flow entries based at least in part on at least one key whose size remains constant irrespective of the number of flow entries within the set of flow entries;
- at least one processor configured to:
  - maintain the set of databases stored in the memory;
  - detect a request to perform an operation in connection with at least one flow of data packets within the software-defined network;
  - in response to detecting the request:
    - identify at least one attribute of the flow of data packets in the request, wherein the attribute of the flow of data packets is included in a header of at least one data packet within the flow of data packets;
    - search, using the attribute of the flow of data packets as a database key, at least one database within the set of databases to facilitate performing the operation in connection with the flow of data packets, wherein the amount of time required to search the database is independent of the number of flow entries within the set of flow entries due at least in part to the constant size of the database's key, wherein:
      - the database within the set of databases comprises a trie data structure;
      - searching the database within the set of databases comprises traversing the trie data structure by:
        - identifying at least one character within the attribute of the flow of data packets;
        - advancing to a node within the trie data structure that corresponds to the character identified within the attribute of the flow of data packets.

19. The system of claim 17, wherein the maintenance module maintains:
- a core database whose key includes:
  - an order of priority of the set of flow entries;
  - at least one match condition of the set of flow entries;
- at least one auxiliary database whose key is different than the core database's key.

20. The system of claim 19, wherein:
- the core database comprises a trie data structure;
- the search module searches the database within the set of databases by:
  - identifying a priority level of the flow of data packets in the request;
  - identifying at least one attribute of the flow of data packets in the request;
  - searching the core database using the priority level and attribute of the flow of data packets as the core database's key;
  - while searching the core database, identifying a position within the set of flow entries that corresponds to the priority level and attribute of the flow of data packets;
- further comprising an action module, stored in memory, that responds to the request to perform the operation in connection with the flow of data packets by performing the operation on the core database at the identified position within the set of flow entries;
- wherein the physical processor is further configured to execute the action module.

* * * * *